United States Patent [19]

Yamanishi et al.

[11] Patent Number: 4,742,240

[45] Date of Patent: May 3, 1988

[54] IMAGE READING APPARATUS WITH IMAGING MEANS IMAGING SEPARATE AND DISTINCT ROWS OF A DOCUMENT

[75] Inventors: Eiichi Yamanishi; Junji Watanabe, both of Yokohama, Japan

[73] Assignee: Kabushiki Kaisha Toshiba, Kawasaki, Japan

[21] Appl. No.: 34,503

[22] Filed: Mar. 27, 1987

Related U.S. Application Data

[63] Continuation of Ser. No. 654,092, Aug. 28, 1984, abandoned.

[30] Foreign Application Priority Data

Aug. 31, 1983 [JP]  Japan ............................... 58-159310

[51] Int. Cl.$^4$ ............................................. H01N 1/04
[52] U.S. Cl. ................................ 250/578; 358/213.23; 358/293
[58] Field of Search .............. 250/578; 358/212, 293, 358/213.23, 213.26, 213.27

[56] References Cited

U.S. PATENT DOCUMENTS

| | | | |
|---|---|---|---|
| 4,149,091 | 5/1977 | Crean et al. | 358/293 |
| 4,200,788 | 4/1980 | Aqulnek | 250/578 |
| 4,408,230 | 10/1983 | Tamura et al. | 358/293 |
| 4,432,017 | 2/1984 | Stoffel et al. | 358/213 |

FOREIGN PATENT DOCUMENTS

2449295 4/1985 Fed. Rep. of Germany .

Primary Examiner—Edward P. Westin
Assistant Examiner—Charles Wieland
Attorney, Agent, or Firm—Cushman, Darby and Cushman

[57] ABSTRACT

An image reading apparatus and method which does not require that two optical elements be focused on one line of a document. A single optical element is provided for simultaneously guiding light reflected from two lines of the document onto light receiving elements arranged in two staggered rows, respectively. The optical element is a glass fiber lens array having a plurality of light focusing glass fibers arranged in linear fashion. The light receiving elements include a photoelectric alloy and are arranged in an effective field of view of the fiber lens array. Since the document is scanned, each line of the document is read by each row of light receiving elements, one row at a time. To form a complete image of the line, the output signals of each of the rows must be synchronized. This is accomplished in a signal processing circuit where the output signal of one row is delayed by a period of time equal to the distance between the two rows divided by the scanning velocity. The synchronized signals can be output to provide a complete and accurate image of the document line even where the document was not lying flat when it was read.

20 Claims, 9 Drawing Sheets

IMAGE READING APPARATUS WITH IMAGING MEANS IMAGING SEPARATE AND DISTINCT ROWS OF A DOCUMENT

BACKGROUND OF THE INVENTION

This invention relates to an image reading apparatus and method (e.g., used with a thermal transfer type copying machine).

Color copying machines of the thermal transfer type are now in widespread use. In the copying machine, a document is scanned to produce an image signal representing the document. The image signal is divided into color component signals. Images of the respective color components are superposedly impressed on a single copy sheet so that a colored copy is obtained.

Figure 1:
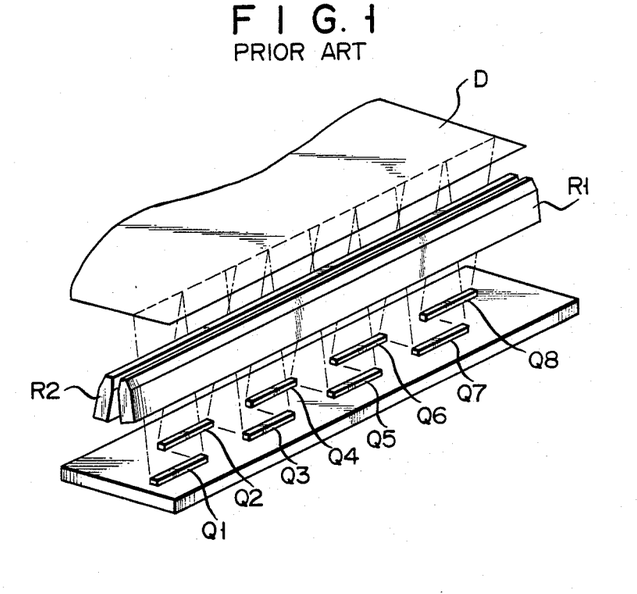
FIG. 1 illustrates a conventional image reading apparatus used with a thermal transfer color copying machine.

A description with reference to FIG. 1 of an image reading apparatus used with a conventional thermal transfer type copying machine will now be given. A document D is illuminated by a lamp (not shown). Light reflected from one scanning line of the document is guided to light receiving elements, thereby producing an image signal of a corresponding scanning line as a result of photoelectric conversion. The whole of the document is read, while the lamp and the light receiving elements travel along the document. The light receiving elements are comprised of CCD line sensors.

One CCD line sensor, produced in quantity by a known technique, is shorter than the width of the document, i.e., the length of the scanning line of the document. Therefore, eight CCD line sensors Q1 through Q8 are arranged along a scanning line of the document. The CCD line sensor is comprised of a package and an array of the photosensitive elements contained in the package. The effective of the CCD line sensor is the of the photosensitive elements array and is shorter than that of the package. To ensure the contiguity of the read out image signal, the CCD line sensors Q1 through Q8 are alternately staggered in two rows and each of the sensors overlaps the adjacent two CCD line sensors.

Light reflected from the scanning line is transmitted to CCD line sensors Q1, Q3, Q5 and Q7 of a first row through a light transmission lens R1 and also transmitted to CCD line sensors Q2, Q4, Q6 and Q8 of a second row through a light transmission lens R2. The light transmission lenses R1 and R2 respectively consist of a fiber lens array comprising a plurality of linearly arranged light focusing glass fibers such as a "SELFOC" lens, a trade name of a glass fiber lens manufactured by the Japan Glass Plate Mfg. Co. The two fiber lens arrays R1 and R2 are arranged in the form of an inverted V shape as viewed from the cross section. The optical axes of both lenses R1 and R2 intersect each other on the document D.

Therefore, an image signal corresponding to one scanning line is simultaneously produced from the CCD line sensors even if the CCD line sensors are not arranged in one row. However, difficulties arise from the fact that the optical axes of the two lens arrays R1 and R2 intersect each other on the document D. The optical axes intersect each other on the upper surface of the document table. Therefore, the axes intersect each other on the document so long as the document is flat. If the document is not flat and the document is not placed flush against the document table, the optical axes of the two lens arrays are directed towards different scanning lines of the document and consequently each row of the CCD line sensors, Q1 through Q8 staggered in two rows, reads out a different scanning line. Therefore, it sometimes happens that an original straight line of document is copied in a zigzag form.

Furthermore, it is difficult to exactly intersect two optical axes at the upper surface of the document table. The precision of the optical axis of the fiber lens arrays R1 and R2 generally involves some errors. Therefore, it is necessary to perform various adjustment operations after the assembly of an image reading apparatus. For instance, the lens arrays are horizontally and vertically moved to adjust the intersecting angle of both lines of the letter V formed by the axes of the lens arrays R1 and R2. This adjustment work consumes a great deal of time and labor.

SUMMARY OF THE INVENTION

It is an object of the present invention to provide an image reading apparatus and method which can correctly read an image of a document, regardless of whether the document is a flat or not, thereby dispensing with any adjustment work.

To attain the above object, this invention provides an image reading apparatus and method in which light is received from two separate scanning lines on a document and guided onto two separate rows of light receiving elements. This eliminates the need to adjust the optical system to focus on only one scanning line. Since the document is being scanned, a relative velocity is produced between the document and the light receiving elements. Therefore, each scanning line of the document is read by both rows of light receiving elements, one row at a time. In order to produce a complete image of each scanning line, the output signal of one of the rows must be delayed so as to be synchronous with the output signal of the other row. This is accomplished by delaying the output signal of the first row by the amount of time required for the two rows of light receiving elements to receive light from the same scanning line.

DETAILED DESCRIPTION OF THE PREFERRED EMBODIMENTS

Figure 2:
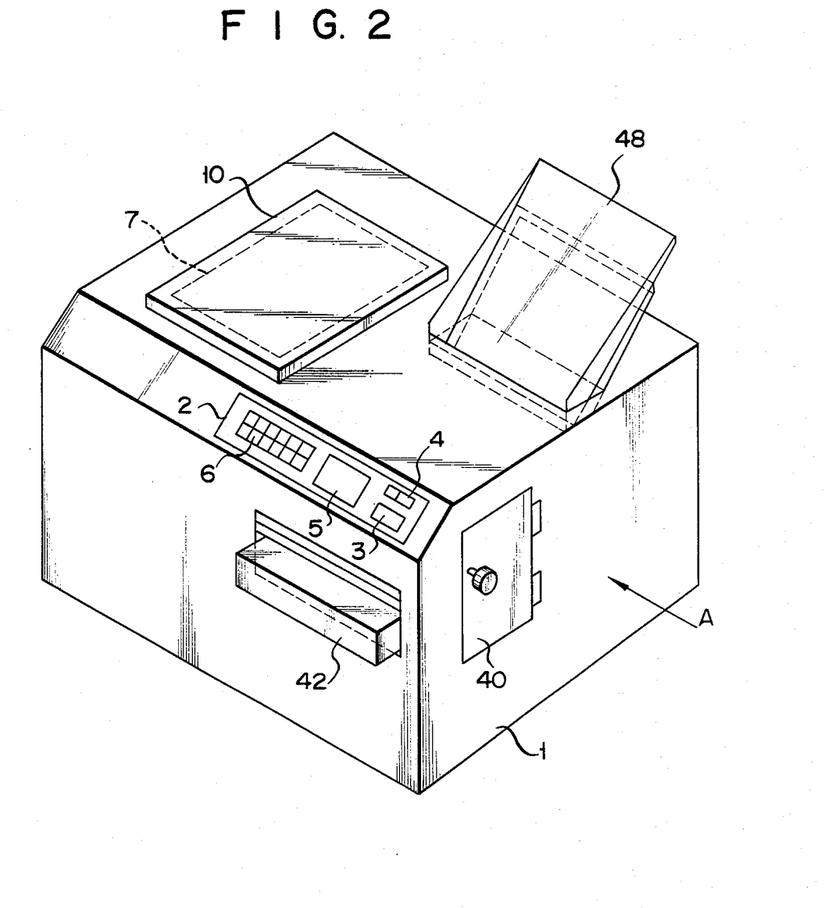
FIG. 2 is a perspective view showing the external appearance of a thermal transfer type color copying machine which involves an image reading apparatus according to a first embodiment of this invention.
Figure 3:
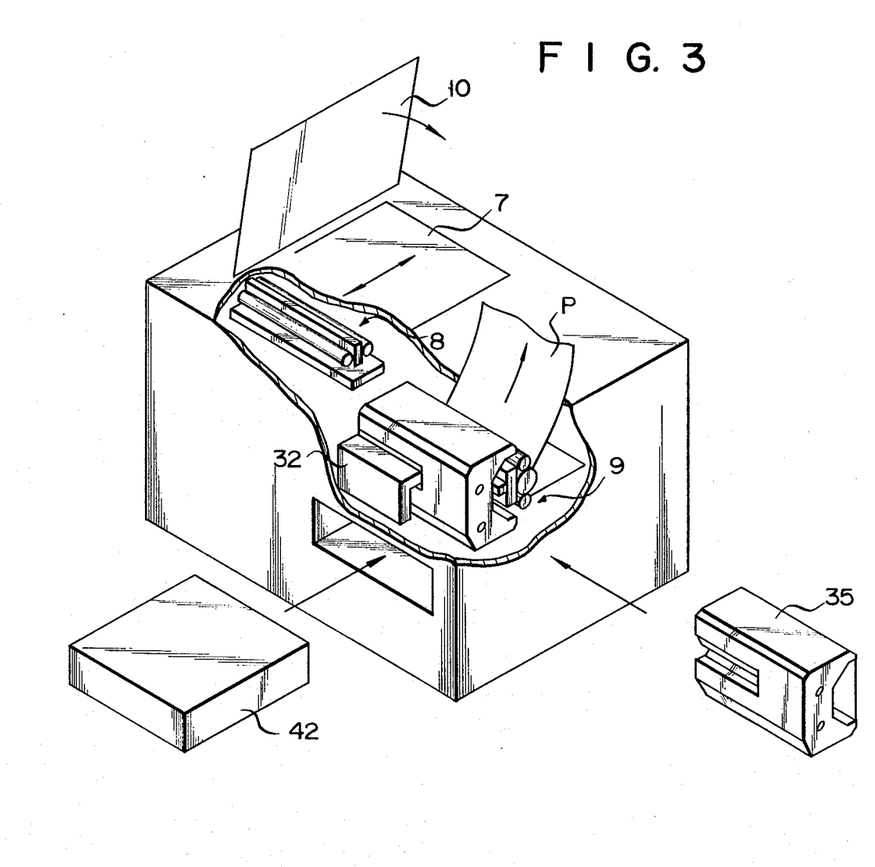
FIG. 3 is a perspective view of the main portion of the interior of the copying machine shown in FIG. 2.

A description will now be given with reference to the accompanying drawings of an image reading apparatus and method according to the present of this invention, which is used with a thermal transfer type color copying machine. As seen from FIG. 2, an operation panel 2 fitted with a start key 3, sheet number indicator 4, operation mode indicator 5 and a key-input device 6 for defining the number of desired copies is provided on the upper front side of the copying machine 1. Provided on the upper left side of the copying machine 1 are a document table 7, formed of a transparent glass, and a cover 10. Provided on the upper right side of the copying machine 1 is a paper tray 48 in which a colored copy is discharged. As shown in FIG. 3, an image reading section 8, for picking up an image by scanning a document set on the document table 7, is provided under the document table 7. On the right side of the interior of the copying machine 1 is installed an image forming section 9 for forming a colored copy in accordance with an output from the image reading section 8.

Figure 4:
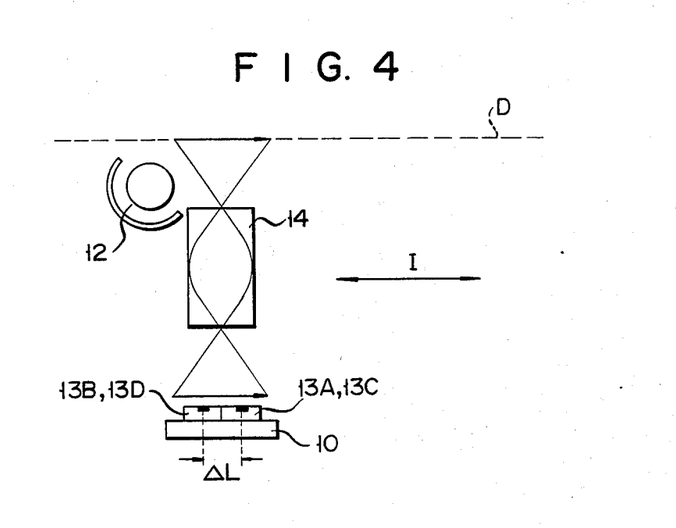
FIG. 4 is a sectional view of the image reading apparatus according to the first embodiment of the invention.

A description will now be given with reference to FIGS. 4 to 7 of the arrangement of the image reading section 8 and its method of operation. As indicated in FIG. 4, the image reading section 8 comprises a lamp (for example, a fluorescent lamp) 12 for illuminating a document D, photoelectric converter 13, optical system 14 for transmitting light reflected from the document D to the photoelectric converter 13 and a base board 10 for supporting all the above-mentioned members. The base board 10 can be moved reciprocally in the direction indicated by an arrow I. When the base board is moved to the right of FIG. 4, the image of the document D is read.

Figure 5:
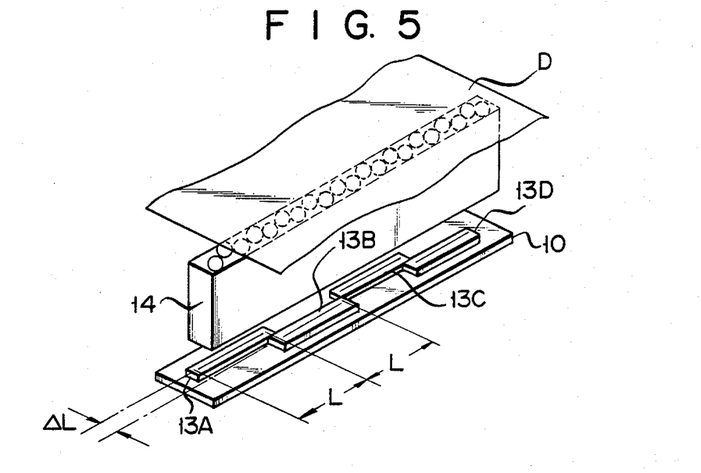
FIG. 5 is a perspective view of the image reading apparatus of the first embodiment.

As shown in FIG. 5, the optical system 14 has a large number of staggered fiber lenses extending along the scanning line of the document D in order to let the optical axes of the lenses extend along the scanning line. It is possible to linearly arrange the fiber lenses. The fiber lenses consist of the aforementioned light focusing glass fibers manufactured by the Japan Plate Glass Mfg. Co. under the trademark "SELFOC". Each fiber lens has a diameter of about 1 mm and is exposed at both ends to allow for the permeation of light.

The photoelectric converter 13 comprises four CCD line sensors 13A, 13B, 13C and 13D respectively each provided with a large number of photosensitive elements. As seen from FIG. 7, the four line sensors are arranged in a staggered fashion of two rows, each row parallel to the direction of a scanning line, in such a manner that the lateral side of the line sensors 13A and 13C, constituting one linear group, overlap the opposite lateral side of the line sensors 13B and 13D, constituting another adjacent linear group, at the end of each sensor. A distance $\Delta L$ between a center line of the line sensors 13A and 13C, constituting one linear group, and a center line of the line sensors 13B and 13D, constituting another adjacent linear group, corresponds to the total distance between two scanning lines. Therefore, what is actually read out by the photoelectric converter 13 is not an image signal representing the same scanning line, but image signals corresponding to two scanning lines apart from each other at the above-mentioned distance $\Delta L$. The distance $\Delta L$ is defined to be smaller than the field of view radius $X_0$ (a range within which an image can be transmitted) of the fiber lenses constituting the optical system 14. Therefore, a single optical system 14 can conduct images corresponding to two scanning lines to the CCD line sensors staggered in two rows at the same time.

Figures 7, 10:
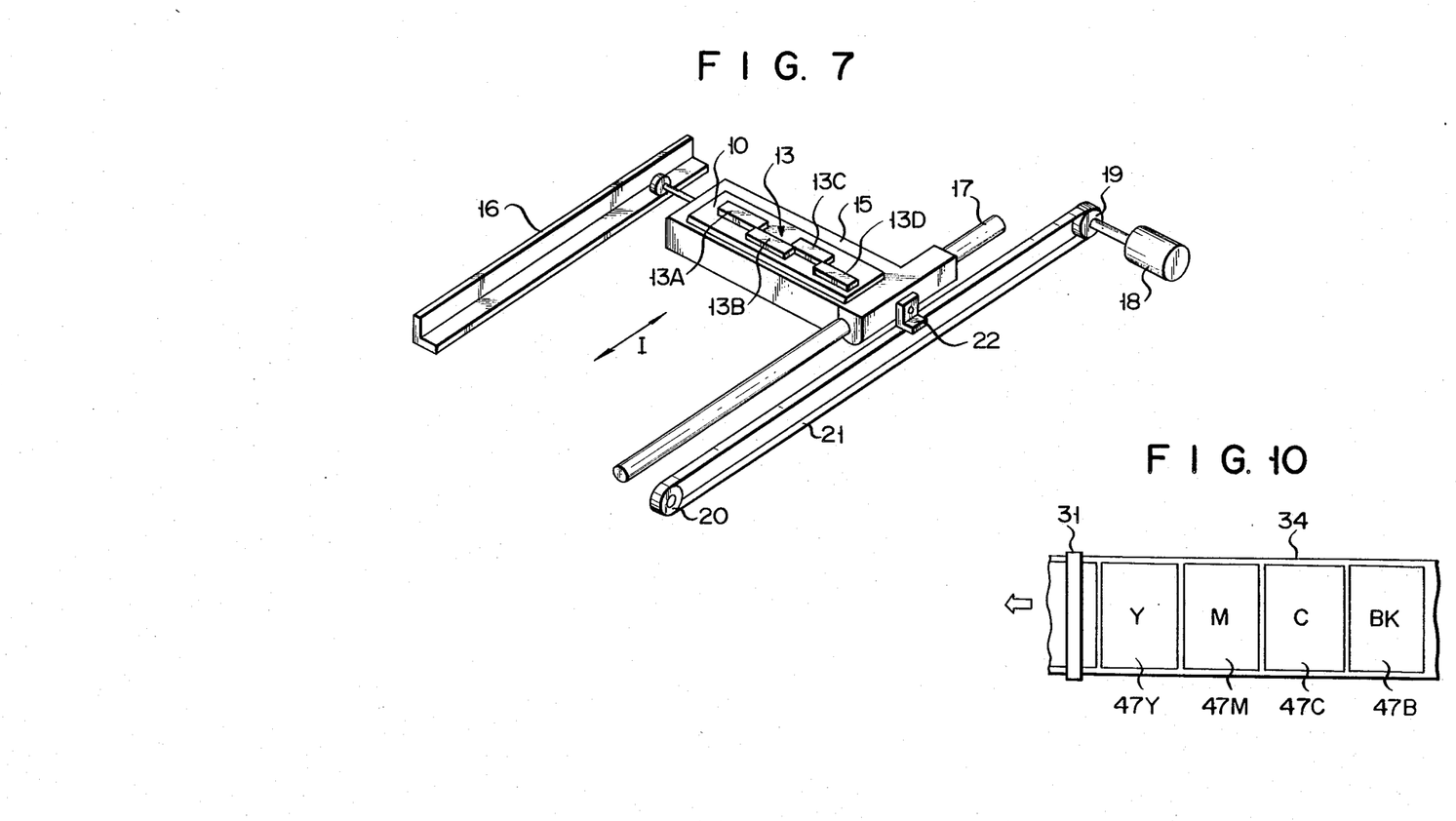
FIG. 7 is a perspective view of the scanning mechanism involved in the embodiment.
FIG. 10 is a plan view of an ink ribbon used with the image forming section of FIG. 8.

Now let it be assumed that the scanning line which is read by the CCD line sensors 13A and 13C is ahead of the scanning line read by the CCD line sensors 13B and 13D as counted from the top of the page in scanning order. In other words, one-half of a piece of image information corresponding to one scanning line is first read by the CCD line sensors 13A and 13C, and later the remaining half of the piece of image information is read by the CCD line sensors 13B and 13D. Further let it be assumed that the effective reading length of the respective line sensors is represented by L (for ease of packaging, for example, photosensitive elements are not arranged for the full length of the sensor). Then the effective reading length of the whole photoelectric converter 13 is represented by 4L. If, therefore, the number of the CCD line sensors is changed, the effective reading length of the whole photoelectric converter 13 can be freely varied.

Figure 6:
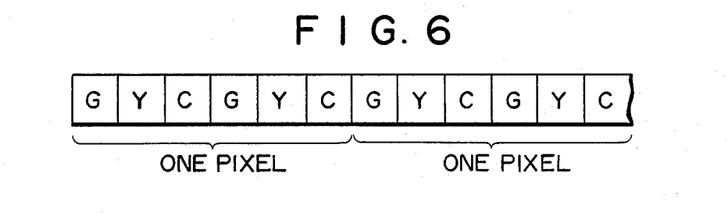
FIG. 6 is a plan view showing the arrangement of picture elements of the CCD line sensors used with the first embodiment.

As shown in FIG. 6, one pixel of the document is read out by six pixels of the CCD line sensor, that is, green (G), yellow (Y), cyan (C), green (G), yellow (Y) and cyan (C). Namely, the photoelectric converter 13 carries out the photoelectric conversion of light reflected from the document D, and successively sends forth image signals representing the color components of the green G, yellow Y, cyan C in the order mentioned.

The base board 10 is reciprocally along the document D by a scanning mechanism shown in FIG. 7. The base board 10 is fixed to a carriage 15 which is reciprocally guided in the directions of I by means of a guide rail 16 and guide bar 17. An endless belt 21 is stretched along the guide bar 17 between the drive pulley 19 and driven pulley 20. The drive pulley 19 is connected to the drive shaft of a reversible scanning motor 18. A part of the endless belt 21 is connected to the carriage 15 by means of a fixing member 22. Therefore, the carriage 15 is reciprocally moved in the direction of the arrow I by the reversible rotation of the scanning motor 18.

Figure 8:
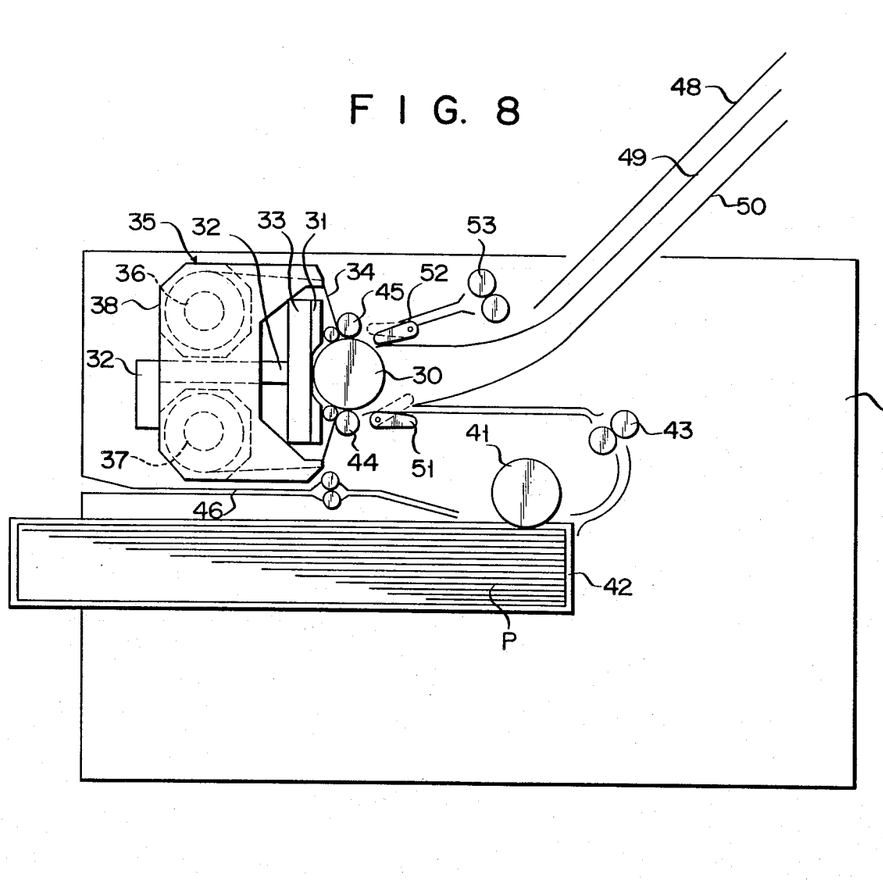
FIG. 8 is a sectional view of the image forming section of the copying machine of FIG. 2.

A description will now be given of the image forming section 9 and its method of operation with reference to FIG. 8, which is a sectional view as viewed from the direction of the arrow A of FIG. 2. A platen roller 30 is horizontally set substantially at the center of the image forming section 9. A thermal head 31 is positioned on the left side of the platen roller 30 as viewed in FIG. 8. The thermal head 31 is fitted to a heat radiator 33 which is integrally formed at the rear end face of a holder 32. A ribbon cassette 35 holding a thermal transfer ink ribbon 34 is detachably fitted to the holder 32 by means of an insertion-withdrawal port provided on the right side of the image forming section 9 (as seen in FIG. 3). As seen from FIG. 2, the port is covered with a lid 40. When the ribbon cassette 35 is fitted to the holder 32, the thermal transfer ink ribbon 34 is brought between the thermal head 31 and platen roller 30. The ribbon cassette 35 comprises a feed reel 36 and takeup reel 37 which are connected to both ends of the thermal transfer ribbon 34 and a case 38 which is partly open to allow the intermediate portion of the thermal transfer ribbon 34 to be set between the platen roller 30 and thermal head 31. When the ribbon cassette 35 is loaded in the subject image forming section 9, the feed reel 36 and takeup reel 37 are connected to the drive shaft of an ink ribbon transport motor (not shown) by means of a drive force-transmitting mechanism (not shown), and rotated.

Figure 9:
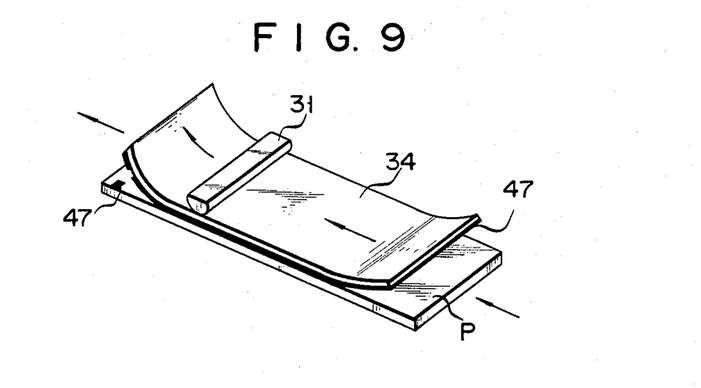
FIG. 9 illustrates the principle by which an image is formed by the iamge-forming section shown in FIG. 8.

Set below the platen roller 30 is a copy sheet feeding cassette 42 holding a plurality of copy sheets P onto which the image impression is transcribed. The copy sheets P in the cassette 42 are taken out one after another by the rotation of the copy sheet feeding roller 41 installed obliquely below the platen roller 30 toward the right of FIG. 8. The leading end position of each copy sheet P is regulated by aligning rollers 43 provided obliquely above the copy sheet-feeding roller 41 toward the right of FIG. 8, and then carried to the platen roller 30. Two push rollers 44 and 45 are pressed against the platen roller 30. A copy sheet P is carried forward with its position exactly defined by the action of the push rollers 44 and 45. When the copy sheet P is brought between the thermal head 31 and platen roller 30, the ink is transferred, as shown in FIG. 9, from the ink ribbon 34 to the copy sheet P by heating the thermal head 31, thereby making an image impression on the copy sheet P. As indicated in FIG. 10, the ink ribbon 34 has the same width as the copy sheet P (which, in this case, is supposed to have one size). The color component regions 34Y (yellow), 34M (magenta), 34C (cyan) and 34 BK (black) of the ink ribbon 34 are successively formed in the order mentioned for each lengthwise division (slightly longer than the length of the copy sheet P) of the ink ribbon 34. Images bearing one of the four colors yellow, magenta, cyan and black are superposed on each other. When the formation of an image in all colors is brought to an end, the copy sheet P is carried toward the paper sheet tray 48. When an image has been formed in each color, the copy sheet P is carried backward towards the push roller 44, ready for the formation of the image in another color. A gate 51 is provided ahead of the push roller 44 and is set on the transport route of the copy sheet P. A gate 52 is provided behind the push roller 45 and is installed on the transport route. These gates 51 and 52 jointly act to open or close the transport route. When the copy sheet P is carried in the forward direction, the gate 51 does not close the transport route as shown in solid lines. As a result, the copy sheet P is wounded around the platen roller 30. When the copy sheet P is moved in the backward direction for the transfer of the remaining colors, the gates 51 closes the copy sheet transport route, as shown by the broken line, and the copy sheet P is guided toward a first guide plate 50. The gate 52 closes the transport route of the copy sheet P, as shown by the broken line, to prevent the copy sheet P from being transported toward the paper sheet tray 48 and to guide the copy sheet P toward a second guide plate 49. The gate 52 remains closed until the transfer of all the colors is brought to an end. When the transfer of all the colors is brought to an end, the gate 52 opens the transport route as shown by the solid lines, causing the paper sheet P to be guided toward the paper sheet tray 48. The copy sheet feeding cassette 42 is detachably fitted to the front side of the subject copying machine 1. According to the present embodiment of this invention, a manual copy sheet feeder 46 is also provided in front of the copy sheet-feeding roller 41 in order to allow the supply of papers one copy sheet after another, by hand.

Figure 11:
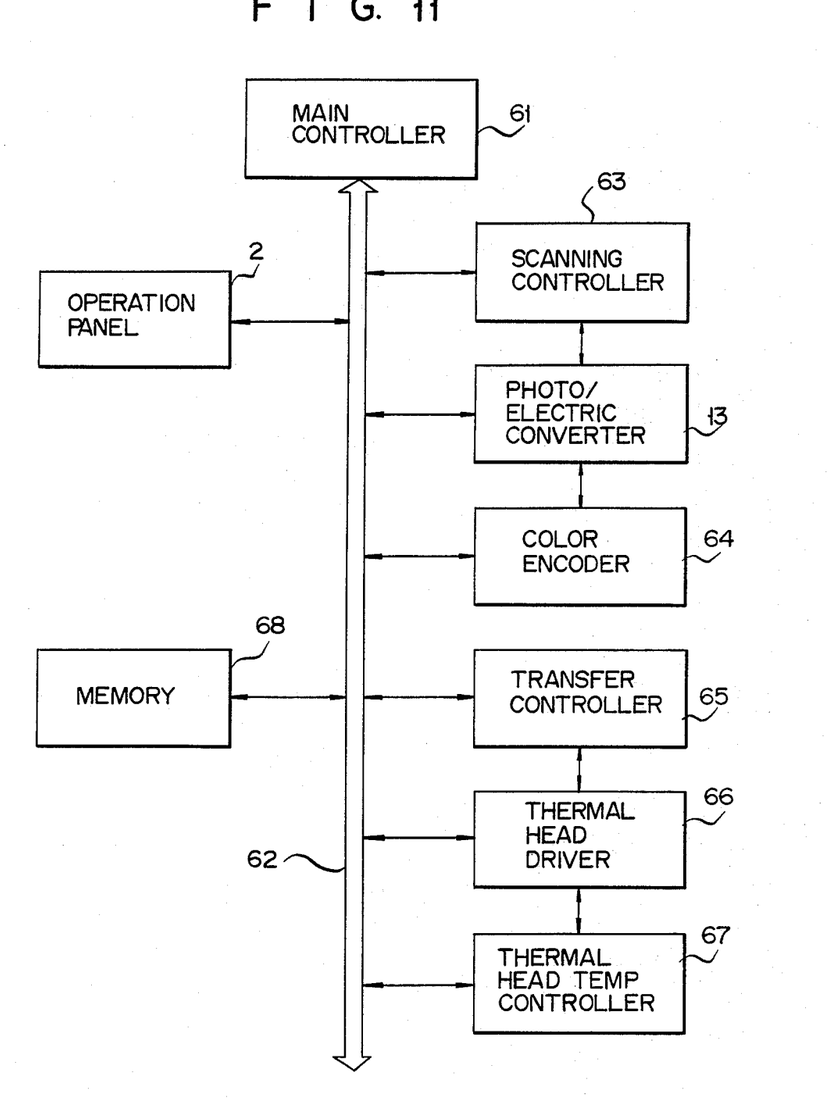
FIG. 11 is a block diagram of a control circuit involved in the copying machine shown in FIG. 2.

FIG. 11 is a block diagram of a control circuit for the image reading apparatus of this invention. This circuit comprises a main controller 61 for controlling the apparatus. The controller 61 comprises a central processing unit (CPU) and terminal circuits associated with the CPU. The control circuit further comprises an operation panel 2, scanning controller 63, photoelectric converter 13, color encoder 64, transfer controller 65, thermal head driver 66, thermal head temperature controller 67 and memory 68—all connected to the main controller 61 by a bus line 62.

The scanning controller 63 controls the lamp 12 of the image reading section 8, the photoelectric converter 13 and the scanning motor 18. The converter 13 converts light from the document D to image signals representing the color components, i.e., yellow (Y), green (G) and cyan (C).

The color encoder 64 converts the signals representing Y, G and C into signals representing the color components Y, M, C and BK of the ink ribbon 34. It can also convert the signals from the main controller 61 via the bus line 62 into color component signals. This is because the circuit 61 is adapted not only to a copying apparatus but also to a printer, a facsimile machine or the like.

The transfer controller 65 controls the platen roller 30, reels 36 and 37 of the ribbon cassette 35, sheet-feeding roller 41, aligning rollers 43, copy-discharging roller 53 and gates 51 and 52. The thermal head driver 66 energizes the heating elements of the thermal head 31. The thermal head temperature controller 67 controls the temperature of the thermal head 31. The memory 68 stores the signals supplied through the bus line 62.

Figure 12:
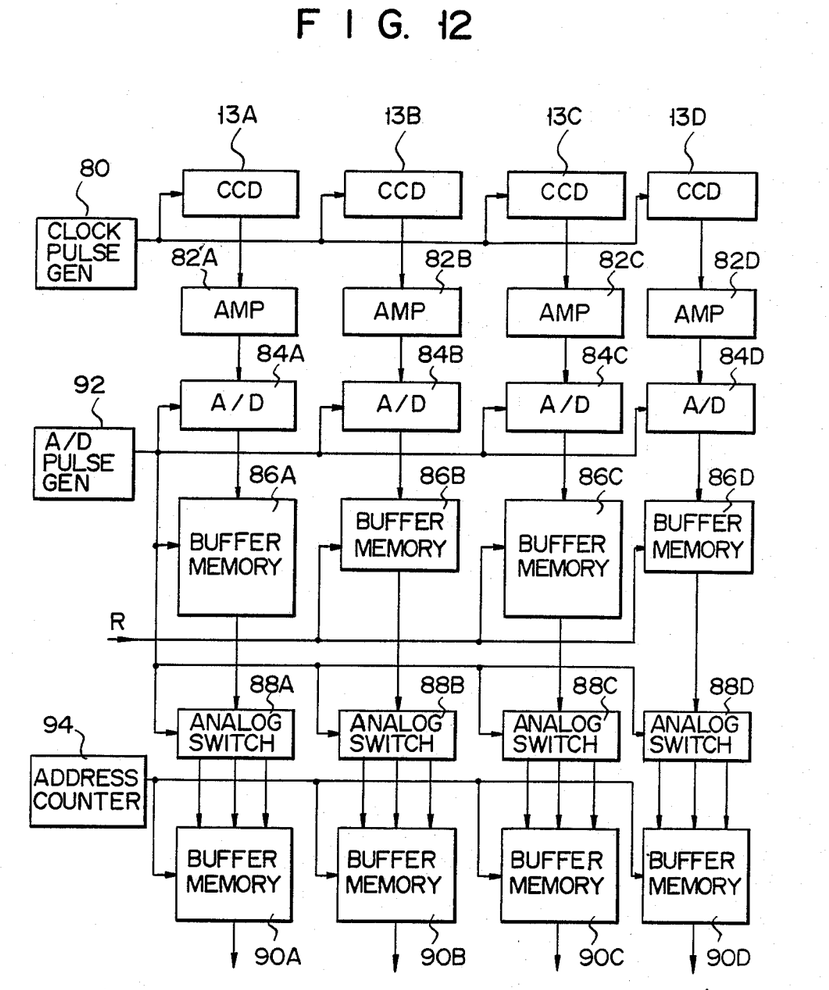
FIG. 12 is a block diagram of a control circuit used with the photoelectric converter shown in FIG. 11.

FIG. 12 is a circuit diagram of the control circuit of the photoelectric converter 13. In this circuit, the output signal of a clock pulse generator 80 is supplied to the CCD line sensors 13A–13D. Each CCD line sensor outputs color component signals Y, G and C one after another. The output signal from the CCD line sensor 13A is supplied to a buffer memory 86A through an amplifier 82A and an A/D converter 84A. Likewise, the output signal from the line sensor 13B is input to a buffer memory 86B via an amplifier 82B and an A/D converter 84B. Similarly, the output signal from the line sensor 13C is input to a buffer memory 86C via an amplifier 82C and an A/D converter 84C; the output signal from the line sensor 13D is input to a buffer memory 86D through an amplifier 82D and an A/D converter 84D. The buffer memories 86A–86D output the image signals in response to a read signal R from the main controller 61. The memories 86A–86D each comprise a shift register. The period during which the signal is transferred from the input terminal to the output terminal is different among these buffer memories 86A–86D. More specifically, the data transfer period of the memories 86A and 86C is longer than that of the memories 86B and 86D. In other words, the buffer memories 86A and 86C have a delay time longer than that of the buffer memories 86B and 86D. The output signals of the CCD line sensors 13A and 13C are delayed by the memories 86A and 86C with respect to the output signals of the CCD line sensors 13B and 13D. It should be noted that the CCD line sensors 13A–13D do not read picture elements on the same scanning line. The CCD line sensors 13A and 13C are positioned before the CCD line sensors 13B and 13D with respect to the scanning direction, their outputs precede those of the CCD line sensors 13B and 13D. Therefore, when the buffer memories 86A and 86C have a delay time which corresponds to the distance ΔL between the row formed by the sensors 13A and 13C and the row formed by the sensors 13B and 13D, the buffer memories 86A–86D output signals as if the CCD line sensors 13A–13D had read picture elements on the same scanning line. Accordingly, the delay time of the memories 86A and 86C is longer than that of the memories 86B and 86D by the value ΔT (=ΔL/v), where v is the speed at which the photoelectric converter 13 moves relative to the document D.

The outputs of the buffer memories 86A–86D are supplied to buffer memories 90A–90D via analog switches 88A–88D. The analog switches split the image signal into color component signals Y, G and C. Each of the memories 90A–90D has a memory capacity to store signals for two scanning lines. Each memory 90A–90D consists of two memory sections, and data is written in one section while other data is being read from the other section. The outputs of the buffer memories 90A–90D comprise the output of the photoelectric converter 13.

As described above, the two rows of CCD line sensors scan different portions of the document D. Therefore, there is no need to adjust the optical system 14 to ensure that one portion of the document is in focus, as viewed from the two rows of CCD lines. Each CCD line receives information independently from the other CCD line. The image of the doument D can therefore be accurately read even if the document D is not laid flat. Since the CCD line sensors of the first row are positioned before those of the second row with respect to the scanning direction, their outputs precede those of the second row CCD line sensors. Nonetheless, since the output signals of the first row CCD line are delayed, the output signals of both rows of CCD line sensors are output at the same time as if all the CCD line sensors had read picture elements on the same scanning line. Hence, the image can be reproduced in the same manner as in the conventional image reading apparatus.

Figure 13:
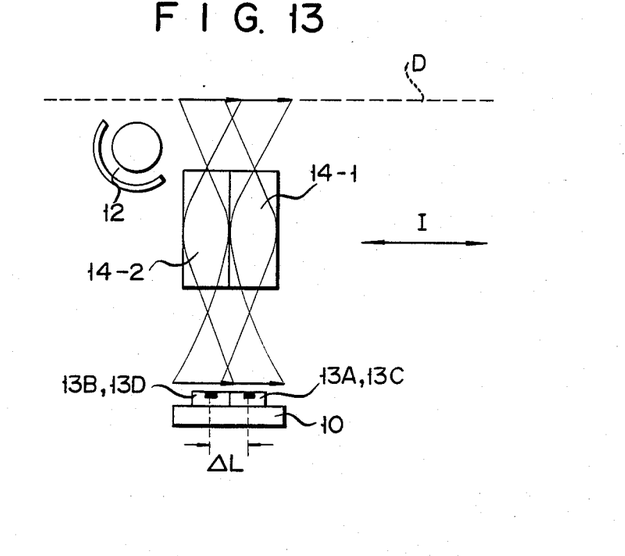
FIG. 13 is a cross sectional view of an image reading apparatus according to a second embodiment of the invention.
Figure 14:
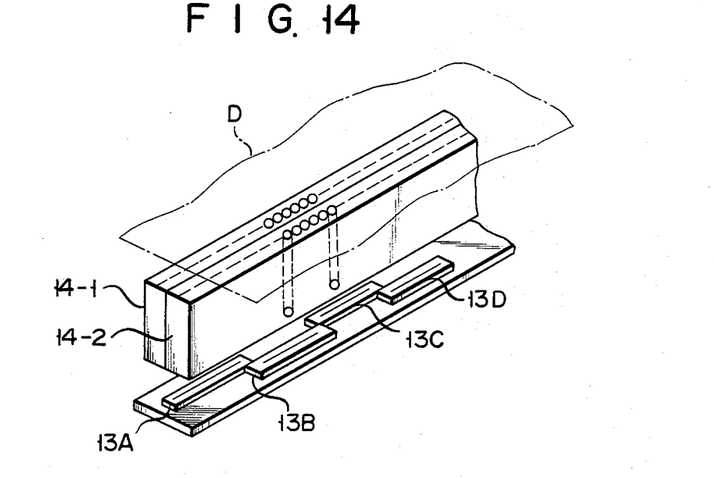
FIG. 14 is a perspective view of the second embodiment.

The second embodiment of the present invention will now be described with reference to FIGS. 13 and 14. As shown in these figures, two fiber lens arrays 14-1 and 14-2 are used in place of the optical system 14 which was used in the first embodiment to guide light reflected from the document to the CCD line sensors. The lens arrays 14-1 and 14-2 have the same structure as the optical system 14. Their optical axes are set apart by the distance ΔL. Light reflected from two scanning lines are respectively guided by the lens arrays 14-1 and 14-2 to CCD line sensors 13A and 13C forming one row and to CCD line sensors 13B and 13D forming another row. The output signals of these CCD line sensors are processed by a control circuit similar to the control circuit used in the first embodiment.

Also in the second embodiment, two rows of CCD line sensors scan different scanning lines of a document D. The image of the document D can therefore be accurately read even if the document D is not laid flat.

As mentioned above, the present invention can provide an image reading apparatus and method which can accurately read an image from a document whether or not the document is laid flat.

The present invention is not limited to the embodiments and methods described above. It suffices to arrange CCD line sensors in a staggered fashion in at least two rows to simultaneously read picture elements on at least two scanning lines. The output signals of the CCD line sensors are arranged so as to be output as if all the CCD line sensors had read picture elements on the same scanning line at the same time when actually, each scanning line was read by each CCD line at a different time. The use of the image reading apparatus is not limited to copying apparatuses; it may be used in combination with a facsimile apparatus, or the like.

What is claimed is:

1. An image reading apparatus comprising:
   optical means for forming an optical image of at least two different rows on a document and guiding the image;
   a plurality of light receiving means for receiving said guided image and generating output signals, each light receiving means including a plurality of photosensitive elements arranged in a row, said plurality of light receiving means being disposed in staggered form in at least two rows in an effective field of view of said optical means, said plurality of light receiving means disposed such that each row of said light receiving means receives an optical image of a different row on said document;
   scanning means for moving said optical means and said document relative to each other; and
   signal processing means, receiving said output signals, for delaying at least some output signals by at least a period of time required for two rows of said light receiving means to receive light from a single line on said document.

2. An apparatus according to claim 1, wherein said optical means includes a plurality of light focusing glass fibers linearly arranged along a scanning line of the document, and said light receiving means are staggered in two rows in an effective field of view of said light focusing glass fibers.

3. An apparatus according to claim 1, wherein said optical means is formed by a plurality of light focusing glass fibers arranged in two lines and said light receiving means are staggered in two rows for respectively receiving light reflected from two scanning lines of the document.

4. An apparatus according to claim 1, wherein said light receiving means include CCD line sensors each of which overlaps at both ends with adjacent CCD line sensors.

5. An apparatus according to claim 1, wherein said processing means includes delay circuits respectively supplied with said output signals from said light receiving elements.

6. An image reading apparatus comprising:
   a document table on which a document to be read is placed;
   image reading means for reading the image of said document and converting said image into output signals, including a lamp disposed to illuminate said document, an optical system which includes a plurality of light focusing glass fibers arranged along a line and supplied with light reflected from a plurality of scanning lines of said document, and light receiving means, staggered in a plurality of rows in an effective field of view of said light focusing glass fibers, for photoelectrically converting light supplied through said optical system into said output signals;

scanning means for moving one of said document table and said image reading means relative to the other; and signal processing means supplied with said output signals for delaying the output signal from each row of the light receiving means for a given time period obtained by dividing a distance between each row of light receiving means of said each row and the light receiving means by a moving speed of said document table relative to said image reading means.

7. An image forming apparatus comprising:

optical means for guiding light which is reflected from at least two different scanning lines of a document having a plurality of scanning lines;

a plurality of light receiving means, each of said light receiving means including a plurality of light receiving elements arranged in a row, said plurality of light receiving means arranged in at least two staggered rows, each row receiving light from a different scanning line on said document, for receiving said guided light and generating a plurality of output signals, each one of said plurality of output signals corresponding to one of said rows;

scanning means for producing a relative velocity between said optical means and said document; and signal processing means for receiving said plurality of output signals from said plurality of light receicing means and generating a complete image of each one of said plurality of scanning lines by synchronizing output signals of each of said rows by delaying an output signal of one of said rows to be simultaneously output with an output signal from another said row, said output signal of said one row being delayed by a time period equal to a distance between said two rows divided by said relative velocity.

8. A method of reading an image, comprising the steps of:

receiving light reflected from at least two different lines on the surface of a document with a plurality of light receiving means, each of which include a plurality of light receiving elements arranged in a row, said light receiving means being arranged in staggered form in at least two rows and generating output signals corresponding to each of said rows;

scanning said document by moving said light receiving means and said document relative to each other; and delaying at least some of said output signals by at least the period of time required for said two rows of light receiving means to receive light from a single line on said document.

9. A method for forming an image, comprising the steps of:

receiving light reflected from at least two lines on the surface of a document having a plurality of scanning lines onto a plurality of light receiving structures, each light receiving structure including a plurality of light receiving elements arranged in a row, said light receiving structures being arranged in staggered form in at least two parallel rows, and generating output signals corresponding to each of said parallel rows;

scanning said document by producing a relative velocity between said document and said light receiving elements; and generating a complete image of each one of said plurality of scanning lines by synchronizing the output signals of each of said rows by delaying the output signal of one of said rows so as to be simultaneously output with the output signal from another of said rows, said output signal of said one row being delayed by a time period equal to a distance between said two rows divided by said relative velocity.

10. An image reading apparatus according to claim 1, in which said optical means guides the image without changing a magnification of said image.

11. An image reading apparatus according to claim 2, in which plural light receiving means are arranged under a single light focusing glass fiber.

12. An image reading apparatus according to claim 3, in which plural light receiving means are arranged under a single light focusing glass fiber.

13. An image reading apparatus comprising:

optical means for forming an optical image of at least two different rows on a document and guiding the image; and a plurality of light receiving means for receiving said guided image and generating output signals, each said light receiving means including a plurality of light receiving elements arranged in a row, said light receiving means being disposed in staggered form in at least two rows in an effective field of view of said optical means, said light receiving means arranged such that each row of said light receiving means receives an optical image of a different row on said document.

14. An apparatus as in claim 13 wherein said optical means comprises a fiber lens array comprising a plurality of linearly arranged light focusing glass fibers.

15. An apparatus as in claim 1 wherein said optical means comprises a fiber lens array comprising a plurality of linearly arranged light focusing glass fibers.

16. An apparatus as in claim 7 wherein said optical means comprises an fiber lens array comprising a plurality of linearly arranged light focusing glass fibers.

17. A method as in claim 8 comprising the further step of using a fiber lens array comprising a plurality of linearly arranged light focusing glass fibers to guide said light from the surface of the document.

18. A method as in claim 9 comprising the further step of using a fiber lens array comprising a plurality of linearly arranged light focusing glass fibers to guide said light from the surface of the document.

19. An apparatus as in claim 6 wherein said optical means comprises a fiber lens array comprising a plurality of linearly arranged light focusing glass fibers.

20. An apparatus as in claim 14 wherein each said light receiving means overlaps at least one other light receiving means only over a portion of said other light receiving means, so that each row overlaps another row only at a location adjacent to a boundary between adjacent light receiving means and there are portions of each light receiving means that are not adjacent to another light receiving means in a column direction.

* * * * *

UNITED STATES PATENT AND TRADEMARK OFFICE
CERTIFICATE OF CORRECTION

PATENT NO. : 4,742,240
DATED : May 3, 1988
INVENTOR(S) : YAMANISHI et al

It is certified that error appears in the above-identified patent and that said Letters Patent is hereby corrected as shown below:

IN THE LETTERS PATENT:

Please change, "654,092" to --645,092--

Cover page, left column, field [63],

Column 1, before line 7, insert "This is a continuation of application serial number 645,092, filed August 28, 1984, which was abandoned upon the filing hereof."

Signed and Sealed this

Thirty-first Day of January, 1989

Attest:

DONALD J. QUIGG

*Attesting Officer*  *Commissioner of Patents and Trademarks*